United States Patent
Miyama et al.

(10) Patent No.: US 7,847,429 B2
(45) Date of Patent: Dec. 7, 2010

(54) VEHICLE POWER SUPPLY DEVICE

(75) Inventors: Syuji Miyama, Tokyo (JP); Kentaro Yasuoka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 141 days.

(21) Appl. No.: 12/401,880

(22) Filed: Mar. 11, 2009

(65) Prior Publication Data

US 2009/0230766 A1   Sep. 17, 2009

(30) Foreign Application Priority Data

Mar. 12, 2008   (JP)   ............................. 2008-063156

(51) Int. Cl.
*H02J 7/00* (2006.01)
*H02J 7/34* (2006.01)

(52) U.S. Cl. ..................................... 307/9.1

(58) Field of Classification Search ............... 307/9.1
See application file for complete search history.

(56) References Cited

U.S. PATENT DOCUMENTS

| | | | | |
|---|---|---|---|---|
| 4,968,942 A | * | 11/1990 | Palanisamy | 324/430 |
| 6,285,163 B1 | * | 9/2001 | Watanabe et al. | 320/132 |
| 6,621,250 B1 | * | 9/2003 | Ohkubo et al. | 320/136 |
| 6,747,457 B2 | * | 6/2004 | Suzuki | 324/433 |
| 7,679,328 B2 | * | 3/2010 | Mizuno et al. | 320/132 |
| 7,688,023 B2 | * | 3/2010 | Yoon et al. | 320/104 |
| 2005/0073315 A1 | * | 4/2005 | Murakami et al. | 324/433 |

FOREIGN PATENT DOCUMENTS

JP   09-149509 A   6/1997

* cited by examiner

*Primary Examiner*—Jared J Fureman
*Assistant Examiner*—Adi Amrany
(74) *Attorney, Agent, or Firm*—McDermott Will & Emery LLP

(57) ABSTRACT

The present invention provides a vehicle power supply device that is capable of suppressing deterioration of a capacitor, shortening a precharging time, and suppressing power loss. An ECU estimates a polarization condition of a battery after a key has been switched OFF (IG SW_OFF), and opens a main relay after determining that the polarization condition of the battery has been eliminated. Thus, a voltage difference between a battery voltage and a capacitor voltage when the main relay is subsequently reconnected can be reduced. Hence, even when the capacity of the capacitor is increased, the time required for precharging can be shortened, and energy regeneration and so on can be realized efficiently within a short time period after switching the key ON. In this case, a situation in which the post-release capacitor voltage is maintained at an unnecessarily high level can be prevented even when charging polarization occurs in the battery, and as a result, deterioration of the capacitor can be suppressed.

6 Claims, 8 Drawing Sheets

US 7,847,429 B2

VEHICLE POWER SUPPLY DEVICE

CROSS-REFERENCE TO RELATED APPLICATION

The present application claims priority under 35 U.S.C. §119 to Japanese Patent Application No. 2008-063156, filed on Mar. 12, 2008, and which is hereby incorporated by reference herein it its entirety.

BACKGROUND OF THE INVENTION

1. Field of the Invention

The present invention relates to a vehicle power supply device in which a capacitor is disposed parallel to a secondary battery.

2. Description of the Related Art

It has been proposed in the related art that a capacitor such as an electrolytic capacitor or an electric double layer capacitor be disposed parallel to a secondary battery such as a lead battery in a power supply device for various types of vehicles such as a gasoline vehicle, a diesel vehicle, a hybrid vehicle, and an electric automobile. When this type of power supply device is installed in an electric automobile or the like, for example, energy generated during vehicle deceleration can be regenerated efficiently as electric power, enabling an extension of the range that can be traveled in a single charging cycle. Meanwhile, in a gasoline vehicle or a diesel vehicle, for example, an improvement in fuel efficiency can be achieved through a comparatively simple constitution by varying a generated voltage of an alternator to control charge and discharge to and from the capacitor, and as a result, effects such as an improvement in the starting property of a so-called idling stop function can be achieved without the need for size increases and the like in the secondary battery.

In this type of power supply device, a relay (main relay) is typically provided to release the capacitor electrically from the secondary battery in cases such as when an ignition switch (IG SW) is switched OFF or an abnormality occurs in the capacitor. To prevent deterioration of the capacitor caused by the voltage applied thereto, discharge control is typically performed on the capacitor when the main relay is opened after the IG SW is switched OFF. Further, to prevent the occurrence of a large inrush current while the main relay is ON due to a potential difference between the discharged capacitor and the secondary battery or the like, a precharge relay is provided alongside the main relay to connect the capacitor to the secondary battery via a current limiting resistor. By switching the precharge relay ON in advance of the main relay to precharge the capacitor, the potential difference between the capacitor and the secondary battery is alleviated.

As an example of a technique for reducing the frequency of precharging performed in this manner, Japanese Unexamined Patent Application Publication H9-149509 discloses a technique in which discharge of the capacitor is prohibited until a key is removed from a key cylinder while the IG SW is OFF.

Incidentally, demands have been made for an increase in the capacity of the capacitor in this type of power supply device from the viewpoint of improving the energy regeneration efficiency and so on. However, increases in the capacity of the capacitor lead to increases in the amount of power that is lost by discharging the capacitor when the IG SW is switched OFF and the amount of time required for precharging before the main relay is switched ON.

Hence, particularly when the vehicle is driven for a short time and then left stationary with the key switched OFF repeatedly, the frequency with which opportunities for energy regeneration and so on are lost increases during precharging, and moreover, the amount of power lost due to discharge of the capacitor increases, and as a result, energy efficiency may deteriorate.

SUMMARY OF THE INVENTION

The present invention has been designed in consideration of the circumstances described above, and it is an object thereof to provide a vehicle power supply device that is capable of suppressing deterioration of a capacitor, shortening a precharging time, and suppressing power loss.

The present invention is a vehicle power supply device having a secondary battery, a capacitor connected parallel to the secondary battery, a relay interposed between the secondary battery and the capacitor, and relay control means for open-controlling the relay after a key is switched OFF, the vehicle power supply device further having polarization estimating means for estimating a polarization condition of the secondary battery after the key has been switched OFF, wherein the relay control means opens the relay when polarization in the secondary battery is estimated to have been eliminated by the polarization estimating means.

According to the vehicle power supply device of the present invention, deterioration of the capacitor can be suppressed, the precharging time can be shortened, and power loss can be suppressed.

DESCRIPTION OF THE PREFERRED EMBODIMENTS

Figure 1:
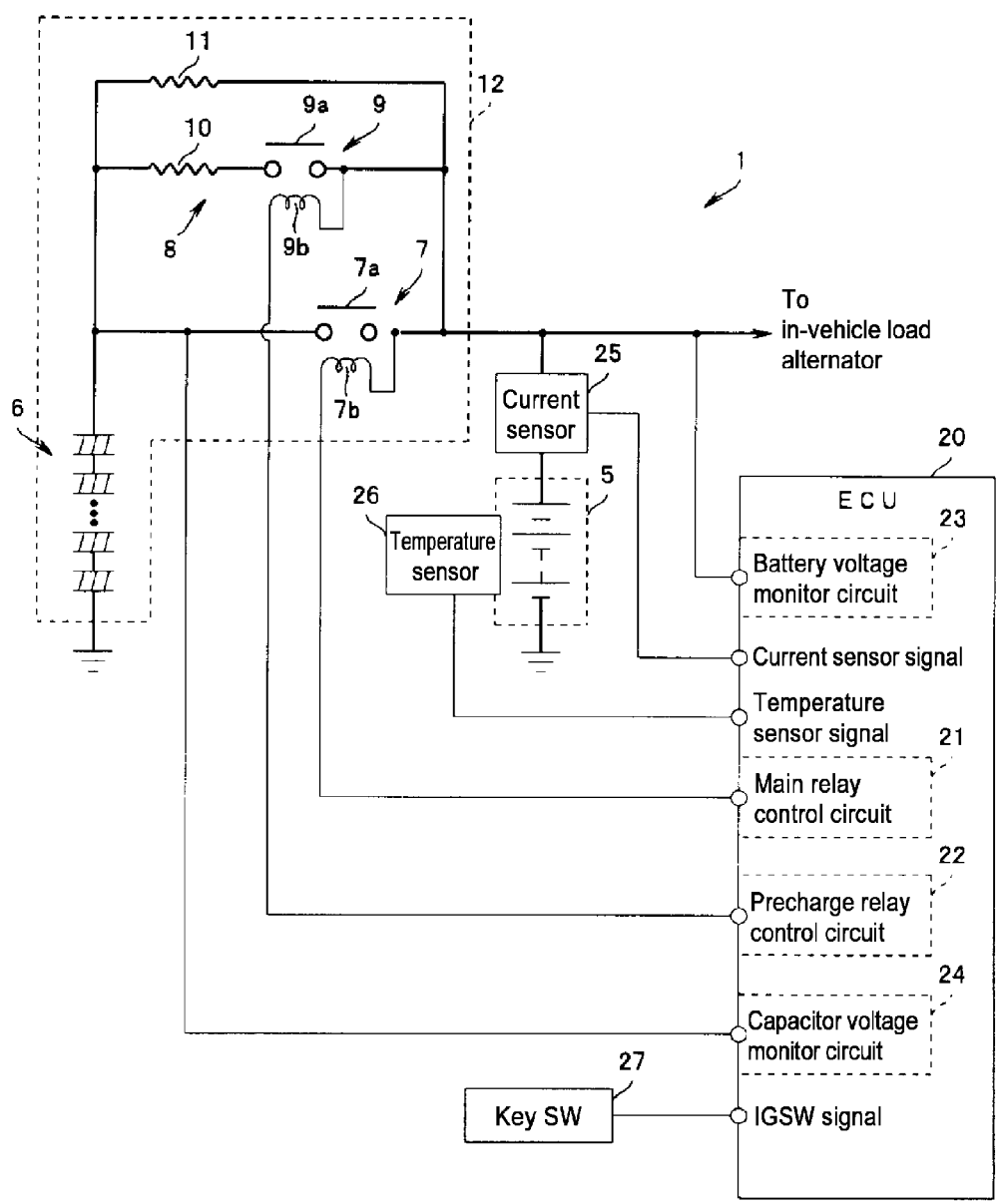
FIG. 1 is a schematic constitutional diagram of a vehicle power supply device.

An embodiment of the present invention will be described below with reference to the drawings. A vehicle power supply device 1 shown in FIG. 1 is mainly constituted by a battery 5 serving as a secondary battery, and a capacitor 6 that is connected parallel to the battery 5 via a main relay 7, for example.

The battery 5 is a 12V battery constituted by a lead storage battery or the like, which is connected to in-vehicle loads (not shown) such as various types of accessories to be capable of supplying power thereto, and to which an alternator (not shown) capable of regenerating energy during vehicle deceleration is connected.

The capacitor 6 is mainly constituted by a cell group comprising a plurality of electric double layer capacitor cells, lithium ion capacitor (LIC) cells, or the like, for example. From the viewpoint of realizing a long lifespan in the capacitor 6, LIC cells, the lifespan of which is unlikely to decrease even when the cells are maintained in a charged state, are preferably used in the cell group of the capacitor 6 according to this embodiment. Further, a large number of capacitor cells connected in series are preferably provided in the cell group of the capacitor 6 so that the voltage applied to each cell can be set low.

The main relay 7 is constituted by a mechanical normally open relay having a contact 7a that is opened (switched OFF) when an electromagnetic coil 7b is not electrified. A main relay control circuit 21 of an electronic control unit (ECU) 20 to be described below is connected to the electromagnetic coil 7b of the main relay 7, and the electromagnetic coil 7b is electrified by a main relay control signal from the main relay control circuit 21 to perform a connection operation (an ON operation) on the contact 7a. When the contact 7a is switched ON, the main relay 7 is connected to the battery 5 and the capacitor 6 electrically and in parallel therewith. As a result, the capacitor 6 becomes capable of generating a momentary large current during engine start-up and the like. Further, the capacitor 6 becomes capable, in cooperation with the battery 5, of charging regenerated power from the alternator efficiently during vehicle deceleration and the like.

Further, a precharge circuit 8 including a precharge relay 9 and a precharge resistor (first current limiting resistor) 10 is connected parallel to the main relay 7. The precharge relay 9 is constituted by a mechanical normally open relay having a contact 9a that is opened (switched OFF) when an electromagnetic coil 9b is not electrified. A precharge relay control output circuit 22 of the ECU 20 is connected to the electromagnetic coil 9b of the precharge relay 9, and the electromagnetic coil 9b is electrified by a precharge relay control signal from the precharge relay control circuit 22 to perform a connection operation (an ON operation) on the contact 9a. When the contact 9a is switched ON, the precharge relay 9 is connected parallel to the battery 5 and the capacitor 6 via the precharge resistor 10. As a result, a current flowing through the precharge circuit 8 is limited to a predetermined current or lower even when a large voltage difference occurs between the battery 5 and the capacitor 6, and thus the contact 9a and so on are protected appropriately. For simplification purposes, the precharge circuit 8 according to this embodiment is constituted by a single circuit including the precharge resistor 10, but the precharge circuit 8 may be constituted by a current control circuit employing a field-effect transistor (FET), an insulated gate bipolar transistor (IGBT) or the like, or a circuit having a multistage current limiting resistor.

Further, a second current limiting resistor 11 is connected parallel to the main relay 7 and the precharge circuit 8. The second current limiting resistor 11 is used when both the main relay 7 and the precharge relay 9 are left open for a long time, for example, to compensate for a potential difference that may occur between a battery [voltage] Vb and a capacitor voltage Vc due to a voltage reduction in the battery 5 caused by a standby current or the like in the vehicle load, a voltage reduction caused by a leak current generated in the capacitor 6, and so on. For this purpose, a resistance value R2 of the second current limiting resistor 11 is set at a much larger value than a resistance value R1 of the first current limiting resistor 10, and a tolerable current of the second current limiting resistor 11 is set to correspond to the leak current generated in the capacitor 6 or at a level for canceling out a part thereof. In other words, the current tolerated by the second current limiting resistor 11 is extremely small such that when both the main relay 7 and the precharge relay 9 are open, the electrical connection between the battery 5 and the capacitor 6 is substantially blocked. Note that the second current limiting resistor 11 maybe omitted where appropriate.

As described above, in the power supply device 1 of this embodiment, the electrical connection between the capacitor 6 and the battery 5 is basically blocked when the relays (the main relay 7 and the precharge relay 9) are open. Furthermore, when the relays are open, the capacitor 6 maintains the power accumulated therein rather than discharging it.

To improve safety and so on, the precharge circuit 8 (the precharge relay 9 and the precharge resistor 10), the second current limiting resistor 11, and so on are preferably unitized by being accommodated in a casing formed integrally with a casing 12 accommodating the cell group of the capacitor 6 and so on.

The ECU 20 is provided with a battery voltage monitor circuit 23 for detecting the voltage of the battery 5, and a capacitor voltage monitor circuit 24 for detecting the voltage of the capacitor 6.

Further, a current sensor 25 for detecting the current of the battery 5 during charge and discharge is connected to the ECU 20, and a charge/discharge current value of the battery 5 detected by the current sensor 25 is input into the ECU 20.

Further, a temperature sensor 26 for detecting the temperature of the battery 5 is connected to the ECU 20, and a battery temperature detected by the temperature sensor 26 is input into the ECU 20. Note that a fluid temperature of the battery 5 is preferably used as the battery temperature, but an ambient temperature in the vicinity of the battery 5, a wall temperature of the battery 5, and so on, for example, may be used instead.

Further, a key switch (key SW) 27 provided in a key cylinder, not shown in the drawing, is connected to the ECU 20, and an IG SW signal indicating an ON/OFF state of an ignition switch (IG SW) is input into the ECU 20 as a key signal.

On the basis of this information, the ECU 20 performs open/close control on the man relay 7 via the main relay control circuit 21, and performs open/close control on the precharge relay 9 via the precharge relay control circuit 22.

More specifically, after detecting that the IG SW has been switched ON on the basis of the IG SW signal input from the key SW 27, the ECU 20 compares the battery voltage Vb detected by the battery voltage monitor circuit 23 to the capacitor voltage Vc detected by the capacitor voltage monitor circuit 24 periodically thereafter, and when a voltage difference $\Delta V$ is within a predetermined range, the ECU 20 performs connection control on the main relay 7 by switching the main relay control circuit 21 ON, whereby the battery 5 and capacitor 6 are directly connected. When the voltage difference $\Delta V$ is not within the predetermined range, the ECU 20 performs connection (ON) control on the precharge relay 9 by switching the precharge relay control circuit 22 ON, whereby the battery 5 and capacitor 6 are connected electrically via the precharge resistor 10. As a result, the capacitor 6 is charged or discharged (precharged) via the precharge resistor 10. After detecting that the voltage difference $\Delta V$ has entered the predetermined range due to the precharging, the ECU 20 performs connection control on the main relay 7 by switching the main relay control circuit 21 ON, whereby the battery 5 and capacitor 6 are directly connected. Note that the ECU 20 opens the precharge relay 9 after connecting the main relay 7.

A phenomenon known as polarization occurs in both lead batteries and the like and in normal batteries, and the battery voltage varies due to this polarization. For example, the battery voltage following charging decreases gradually from the voltage immediately after charging when the battery is left standing following charging, and then stabilizes at a voltage corresponding to the state of charge (SOC). Further, for example, the battery voltage following discharge increases gradually from the voltage immediately after discharge when the battery is left standing following discharge, and then stabilizes at a voltage corresponding to the state of charge (SOC).

When the main relay 7 (and the precharge relay 9) is opened while the battery voltage Vb is in an unstable condition due to polarization, a large voltage difference ΔV occurs between the battery voltage Vb following elimination of the polarization and the capacitor voltage Vc. The voltage difference ΔV leads to unnecessary lengthening of the time required for precharging prior to connection of the main relay 7 when the IG SW is switched from an OFF state to an ON state. Moreover, if the relays are opened after the battery voltage Vb has been caused to vary to a high voltage side by the polarization, the capacitor voltage Vc is held at an unnecessarily high voltage, which is undesirable in terms of the durability of the capacitor 6. Hence, after detecting that the IG SW has been switched OFF on the basis of the IG SW signal input from the key SW 27, the ECU 20 estimates a polarization condition of the battery 5 after switching the IG SW OFF, and opens the main relay 7 after waiting for the polarization condition of the battery 5 to be eliminated.

Here, a sufficient time period (a polarization elimination time To) required to eliminate polarization in the battery 5 is set in advance in the ECU 20 according to this embodiment on the basis of an experiment or the like in order to estimate that the polarization condition of the battery 5 has been eliminated. When an elapsed time T after switching the IG SW OFF exceeds the polarization elimination time To, the ECU 20 estimates that the polarization condition has been eliminated and opens (switches OFF) the main relay 7. Note that since the main relay 7 is controlled to switch OFF when the polarization elimination time To elapses, the polarization elimination time To will be referred to as an OFF determination time To in the following description.

Further, to suppress unnecessary supply to the ECU 20, the electromagnetic coil 7b, and so on after the IG SW has been switched OFF and improve the precision with which elimination of the polarization condition is determined, an optimum OFF determination time To may be set variably in the ECU 20 using the battery temperature and so on as parameters. For example, it is known that in the case of lead battery polarization caused by charging, the polarization occurs when an electrolyte in the vicinity of an electrode plate or contained within minute holes of an active material reacts with the active material due to charging. As a result, a sulfate ion concentration increases locally, leading to an increase in electromotive force. These local concentration differences eventually even out due to dispersion, and in accordance with this evening out, the voltage decreases. The polarization is eliminated by this dispersion phenomenon, and therefore the elimination time is greatly affected by the fluid temperature of the battery. Hence, by determining the OFF determination time To on the basis of the battery fluid temperature, unnecessary operations of the ECU 20, the electromagnetic coil 7b, and so on can be prevented when a long polarization elimination time is not required, for example when the temperature of the battery is high, and as a result, wasteful power expenditure from the battery 5 can be suppressed. In this case, a relationship between the battery temperature and the polarization elimination time is determined in advance through experiment such that the OFF determination time To can be set variably on the basis of the battery temperature detected by the temperature sensor 26 by means of table interpolation or the like.

Further, the intensity of the polarization is affected by the state of charge/discharge up to that point, and therefore a parameter representing the intensity of the polarization (to be referred to hereafter as a polarization correction coefficient) may be calculated on the basis of a current sensor signal from the current sensor 25 or the like such that the OFF determination time To is calculated on the basis of the polarization correction coefficient and the battery temperature. In this case, for example, the SOC may be calculated from an integrated value of the charge/discharge current of the battery 5, which is calculated on the basis of the current sensor signal, whereupon the polarization correction coefficient is calculated in accordance with the SOC and the battery voltage Vb from a two-dimensional table set in advance on the basis of an experiment or the like. The OFF determination time To, which is calculated from a table set in advance through experiment using the battery temperature as a parameter, may then be subjected to integration correction using the polarization correction coefficient. In this method, for example, a representative OFF determination time at each battery temperature may be measured and set in a table having the battery temperature as a parameter, and by determining a multiple of the OFF determination time in a representative state of charge to which the OFF determination time in a different state of charge corresponds, [the polarization correction coefficient] may be set in a two-dimensional table constituted by the SOC and the battery voltage Vb.

Hence, in this embodiment, the ECU 20 functions as relay control means and polarization estimating means.

Figure 2:
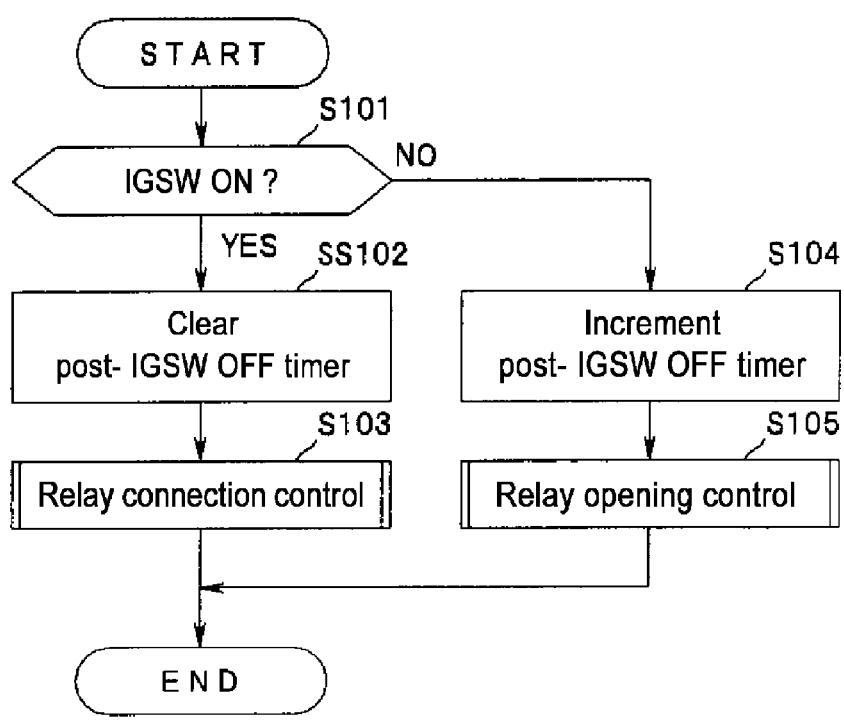
FIG. 2 is a flowchart showing a relay control routine.

Next, open/close control of the main relay 7 and the precharge relay 9, which is performed by the ECU 20, will be described in accordance with the flowchart of a relay control routine shown in FIG. 2.

This routine is executed at set periods (100 ms intervals, for example). When the routine starts, first, in a step S101, the ECU 20 determines whether or not the IG SW is currently ON on the basis of the IG SW signal input from the key SW 27.

When the ECU 20 determines that the IG SW is ON in the step S101, the ECU 20 advances to a step S102, in which a post-IG SW_OFF timer for measuring the elapsed time T after switching the IG SW OFF is cleared. Next, in a step S103, the ECU 20 performs relay connection control, to be described below, and then exits the routine.

When the ECU 20 determines that the IG SW is OFF in the step S101, on the other hand, the ECU 20 advances to a step S104, in which the post-IG SW_OFF timer is incremented. Next, in a step S105, the ECU 20 performs relay opening control, to be described above, and then exits the routine.

Figure 3:
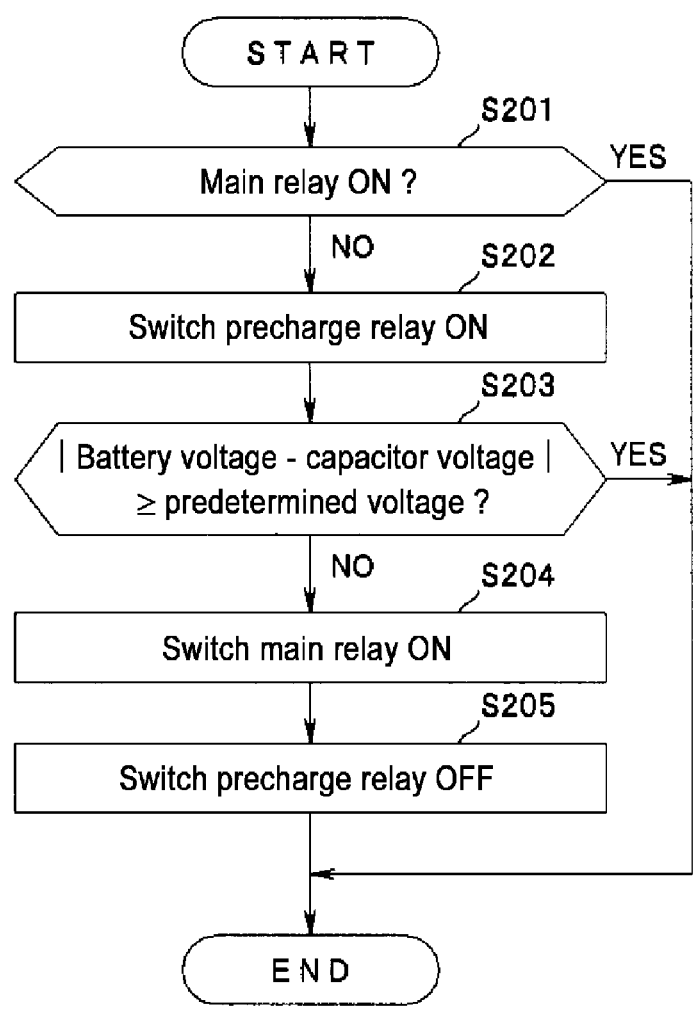
FIG. 3 is a flowchart showing a relay connection control subroutine.

Next, the relay connection control that is executed in the step S103 of the main routine described above will be described in accordance with a relay connection control subroutine shown in FIG. 3.

When this subroutine starts, first, in a step S201, the ECU 20 determines whether or not the main relay 7 is currently ON (connected). When the ECU 20 determines that the main relay 7 is already ON, connection control of the main relay 7 is determined to be complete, and therefore the ECU 20 exits the subroutine without performing any further processing.

When the ECU 20 determines in the step S201 that the main relay 7 is still OFF (open) and not yet ON, on the other hand, the ECU 20 advances to a step S202, in which the precharge relay 9 is switched ON via the precharge relay control circuit 22. The ECU 20 then advances to a step S203.

In the step S203, the ECU 20 determines whether or not an absolute value |ΔV| of the voltage difference ΔV between the battery voltage Vb and the capacitor voltage Vc is equal to or greater than a predetermined voltage V0.

When the ECU 20 determines in the step S203 that the voltage difference absolute value |ΔV| is equal to or greater than the predetermined voltage V0, the ECU 20 determines that precharging is not yet sufficient and exits the subroutine without performing any further processing. Note that when a power supply is introduced for the first time after the vehicle body is assembled or when the difference between the capacitor voltage Vc and the battery voltage Vb is great due to battery run-down or the like, the loop continuing to the step S203 is repeated until precharging is complete. Precharging is completed more quickly as the predetermined voltage V0 used in this determination increases, but to avoid accelerating deterioration of the main relay 7, contact fusion, and so on, the predetermined voltage V0 is set in advance within a potential difference range that does not exceed the tolerable inrush current of the main relay 7.

When the ECU 20 determines in the step S203 that the voltage difference absolute value |ΔV| is smaller than the predetermined voltage V0, on the other hand, the ECU 20 determines that precharging is complete and advances to a step S204, in which the main relay 7 is switched ON via the main relay control circuit 21. Next, in a step S205, the ECU 20 switches the precharge relay 9 OFF via the precharge relay control circuit 22 and then exits the subroutine.

Figure 4:
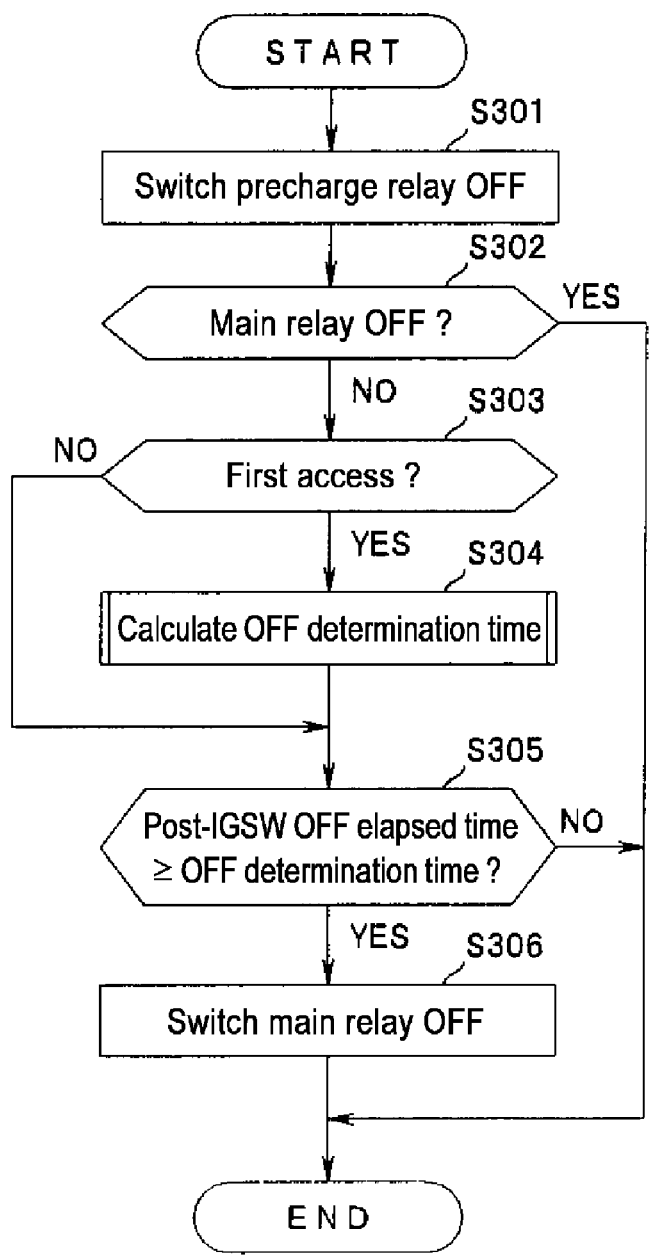
FIG. 4 is a flowchart showing a relay opening control subroutine.

Next, the relay opening control that is executed in the step S105 of the main routine described above will be described in accordance with a relay opening control subroutine shown in FIG. 4.

When this subroutine starts, first, in a step S301, the ECU 20 switches the precharge relay 9 OFF via the precharge relay control circuit 22 and the advances to a step S302. As described above in the steps S204 and S205 of the relay connection control, the precharge relay 9 is controlled to switch OFF when the main relay 7 is switched ON, but in this subroutine, control is performed to switch the precharge relay 9 OFF as a precautionary measure.

Next, in the step S302, the ECU 20 determines whether or not the main relay 7 is OFF. When the ECU 20 determines that the main relay 7 is already OFF, the ECU 20 determines that opening control of the main relay 7 is complete and exits the subroutine without performing any further processing.

When the ECU 20 determines in the step S302 that the main relay 7 is still ON and not yet OFF, on the other hand, the ECU 20 advances to a step S303, in which a determination is made as to whether or not the current processing is the first time that the subroutine has been accessed after switching the IG SW OFF.

When the ECU 20 determines in the step S303 that the current processing is not the first time that the subroutine has been accessed after switching the IG SW OFF, the ECU 20 jumps to a step S305.

When the ECU 20 determines in the step S303 that the current processing is the first time that the subroutine has been accessed after switching the IG SW OFF, on the other hand, the ECU 20 advances to a step S304, in which the OFF determination time To is set. The ECU 20 then advances to the step S305.

Here, setting of the OFF determination time To in the step S304 is performed taking into account the degree of precision required to determine polarization elimination, the effect of a timing delay in switching the main relay 7 OFF, and so on, for example. More specifically, when the tolerable inrush current of the main relay 7 is sufficiently large, the voltage difference ΔV between the battery voltage Vb and capacitor voltage Vc after switching the IG SW OFF may be quite large due to the durability of the main relay 7, and therefore a small amount of polarization may remain without causing problems. Meanwhile, when the consumption current of the ECU 20 and the main relay 7 is sufficiently small, the main relay 7 may be left ON for a longer time than the original polarization elimination time with few power-related effects. In such cases, the polarization elimination time (the OFF determination time To) may be calculated using a simpler method, enabling a reduction in the number of steps, such as a data matching step. In consideration of these points, the OFF determination time To according to this embodiment is set using one of the following methods (1) to (3), for example.

(1) A preset fixed constant is set as the OFF determination time To.

(2) The OFF determination time To is calculated from a table or the like, which is set in advance in accordance with the battery temperature, using an interpolation calculation.

(3) The SOC is calculated by integrating the charge/discharge current of the battery 5, which is detected by the current sensor 25, and the polarization correction coefficient is calculated from the SOC and the battery voltage Vb by referring to a two-dimensional table. The final OFF determination time To is then calculated by subjecting the OFF determination time To determined from the battery temperature with reference to the table to integration correction using the polarization correction coefficient.

Note that the OFF determination time To may be set using a combination of the methods (1) to (3) described above.

When the ECU 20 advances to the step S305 from the step S303 or the step S304, a determination is made as to whether or not the elapsed time T based on the post-IG SW_OFF timer is equal to or longer than the OFF determination time To.

When the ECU 20 determines in the step S305 that the elapsed time T is shorter than the OFF determination time To, the ECU 20 exits the subroutine without performing any further processing.

When the ECU 20 determines in the step S305 that the elapsed time T is equal to or longer than the OFF determination time To, on the other hand, the ECU 20 advances to a step S306, in which the main relay 7 is switched OFF via the main relay control circuit 21. The ECU 20 then exits the subroutine.

Figure 5:
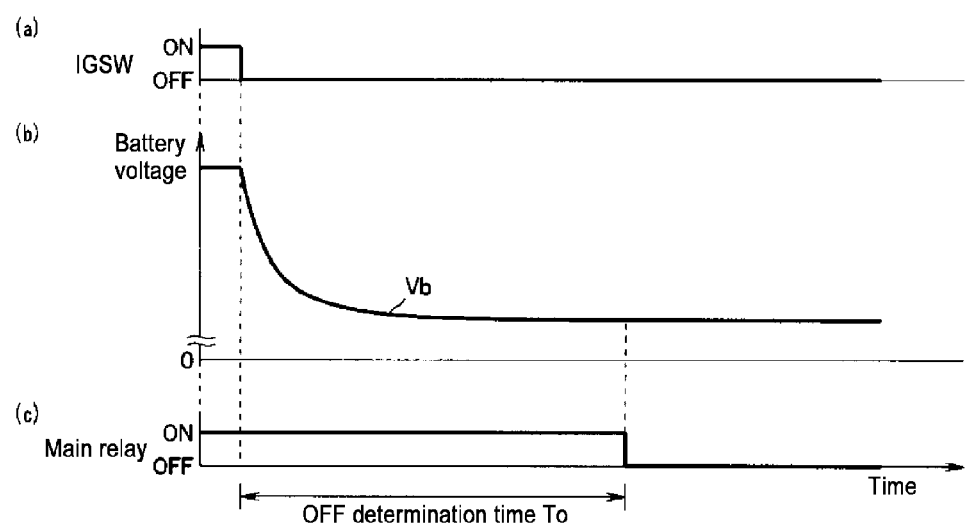
FIG. 5 is a timing chart showing an OFF timing of a main relay controlled by the subroutine of FIG. 4.

As shown in FIG. 5, for example, when polarization caused by charging or the like from the alternator occurs such that the battery voltage Vb increases, the main relay 7 is opened after waiting for the polarization in the battery 5 to be eliminated in accordance with the opening control described above. Here, the generated voltage of a typical alternator is set at approximately 14.5V, for example, but in this system, where the capacitor 6 is connected parallel to the battery (lead battery) 5 and energy regeneration is performed during deceleration, the normal generated voltage is set slightly lower at approximately 13.5V, and energy regeneration to the capacitor 6 is performed by increasing the generated voltage to or above 14.5V only during deceleration. Hence, the battery voltage Vb at the point where the IG SW is switched OFF is normally 13.5V or higher, and since this voltage is higher than an open circuit voltage (OCV), the battery 5 enters a charged state and charging side polarization occurs. Even when power generation is halted, the battery voltage Vb remains higher than the original OCV due to the polarization, but as the polarization is eliminated, the battery voltage Vb decreases, as shown in FIG. 5B. In this case also, the ECU 20 opens the main relay 7 after waiting for the polarization in the battery 5 to be eliminated, and therefore an imbalance between the battery voltage Vb following release of the main relay 7 and the capacitor voltage Vc is eliminated appropriately.

Figure 6:
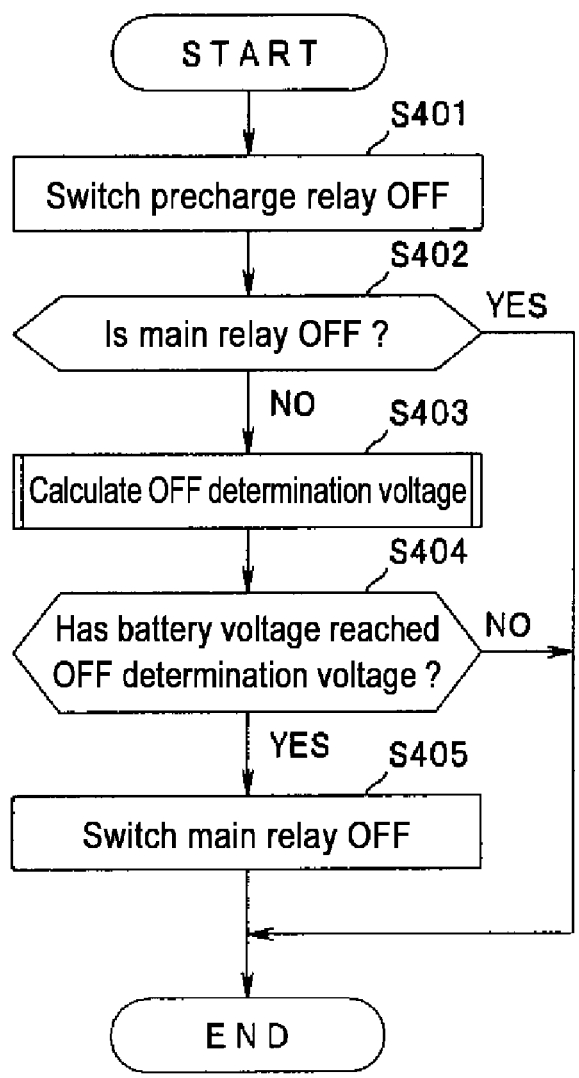
FIG. 6 is a flowchart showing a modified example of the relay opening control subroutine.

Incidentally, the battery voltage Vb, which stabilizes when polarization is eliminated in a lead battery or the like, substantially matches the open circuit voltage (OCV) corresponding to the SOC. Therefore, instead of determining the OFF determination time To (polarization elimination time), the OCV may be calculated from the SOC on the basis of a preset table or the like such that when the difference between the OCV and the battery voltage Vb reaches a predetermined value, the main relay 7 is opened. In this case, the relay opening control executed in the step S105 of the main routine described above is executed in accordance with a relay opening control subroutine shown in FIG. 6, for example, instead of the relay opening control subroutine shown in FIG. 4.

When this subroutine starts, first, in a step S401, the ECU 20 switches the precharge relay 9 OFF via the precharge relay control circuit 22.

Next, in a step S402, the ECU 20 determines whether or not the main relay 7 is OFF. When the ECU 20 determines that the main relay 7 is already OFF, the ECU 20 determines that opening control of the main relay 7 is complete and exits the subroutine without performing any further processing.

When the ECU 20 determines in the step S402 that the main relay 7 is still ON and not yet OFF, on the other hand, the ECU 20 advances to a step S403, in which an OFF determination voltage Vo for determining the OFF timing of the main relay 7 is calculated.

Here, the OFF determination voltage Vo of the step S403 is calculated by performing an interpolation calculation with reference to a preset two-dimensional table on the basis of the SOC and the battery temperature, for example. In this case, the two-dimensional table for calculating the OFF determination voltage Vo is set such that a voltage which is higher than the OCV corresponding to the SOC and the battery temperature by a predetermined voltage is calculated.

Having advanced from the step S403 to the step S404, the ECU20 determines whether or not the battery voltage Vb has reached the OFF determination voltage Vo. More specifically, in this case the ECU 20 determines that the battery voltage Vb has reached the OFF determination voltage Vo when the battery voltage Vb falls below the OFF determination voltage Vo.

When the ECU 20 determines in the step S404 that the battery voltage Vb has not reached the OFF determination voltage Vo, the ECU 20 exits the subroutine without performing any further processing.

When the ECU 20 determines in the step S404 that the battery voltage Vb has reached the OFF determination voltage Vo, on the other hand, the ECU 20 advances to a step S405, in which the main relay 7 is switched OFF via the main relay control circuit 21. The ECU 20 then exits the subroutine.

Figure 7:
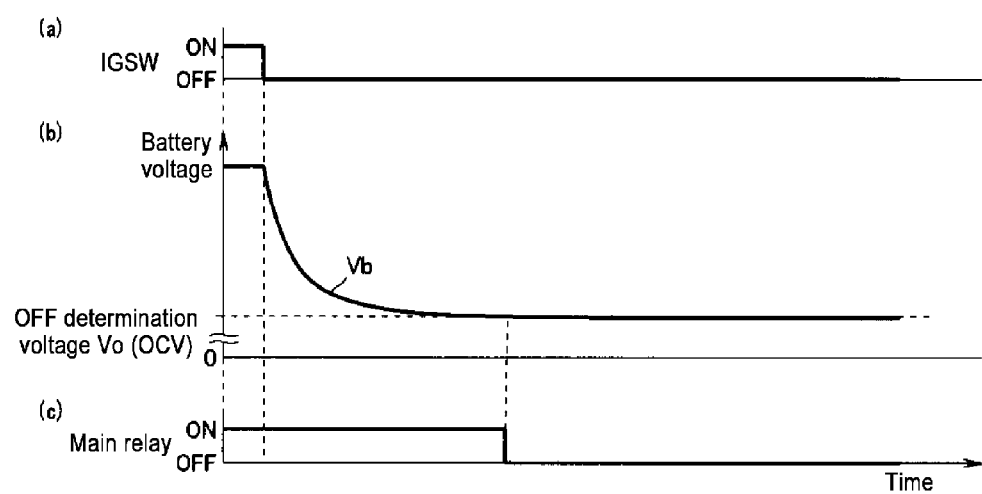
FIG. 7 is a timing chart showing the OFF timing of the main relay controlled by the subroutine of FIG. 6.

As shown in FIG. 7, for example, when polarization caused by charging or the like from the alternator occurs such that the battery voltage Vb increases, the main relay 7 is opened after waiting for the polarization in the battery 5 to be eliminated in accordance with the opening control described above. More specifically, the OFF determination voltage Vo corresponding to the SOC and the battery temperature is calculated when the IG SW is switched OFF, and when the battery voltage Vb falls below the OFF determination voltage Vo, the main relay 7 is switched OFF. Here, the battery voltage Vb is typically expressed by the following Equation (1).

$$Vb = OCV - r \times Ib + Vp \quad (1)$$

Here, r is internal resistance, Ib is the battery current, and Vp is a polarization voltage. In Equation (1), the battery current when the IG SW is switched OFF is small, and therefore the voltage decrease caused by the internal resistance may be considered sufficiently small. Hence, by determining the OCV in advance through experiment and setting the OFF determination voltage at a higher voltage than the OCV by a predetermined voltage, for example, polarization elimination can be estimated at an appropriate timing and the main relay 7 can be switched OFF.

Incidentally, it is known that the battery voltage stabilizes (stops varying) as polarization elimination progresses. A determination as to whether or not the battery voltage has stabilized may be made by comparing the battery voltage Vb to a first order lag battery voltage Vbs, for example. Hence, in the relay opening control subroutine shown in FIG. 6, the first order lag battery voltage Vbs may be set as the OFF determination voltage Vo instead of the OCV such that when the difference between the OFF determination voltage Vo and the battery voltage Vb reaches a preset predetermined value, the polarization is determined to have been eliminated.

Figure 8:
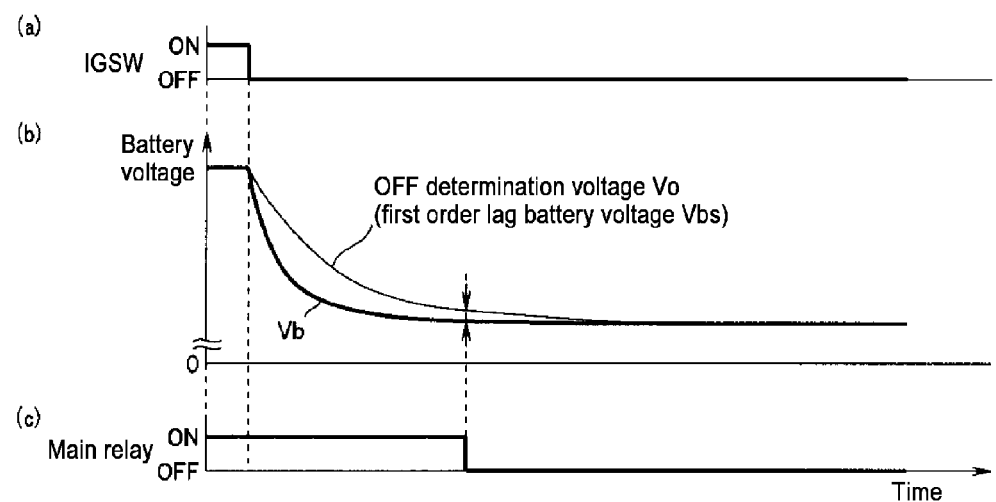
FIG. 8 is a flowchart showing a modified example of the OFF timing of the main relay.

Likewise in this control, as shown in FIG. 8, for example, when polarization caused by charging or the like from the alternator occurs such that the battery voltage Vb increases, the main relay 7 is opened after waiting for the polarization in the battery 5 to be eliminated. In this case, the first order lag battery voltage Vbs may be calculated using the following Equation (2), for example.

$$Vbs_n = Vbs_{n-1} + k \times (Vb - Vbs_{n-1}) \quad (2)$$

Here, k is a constant.

According to this embodiment, as described above, the polarization condition of the battery 5 after switching the key OFF (IG SW_OFF) is estimated, and when it is determined that the polarization condition of the battery 5 has been eliminated, the main relay 7 is opened. In so doing, the voltage difference ΔV between the battery voltage Vb and the capacitor voltage Vc when the main relay 7 is subsequently reconnected can be reduced. Hence, even when the capacity of the capacitor 6 is increased, the time required for precharging can be shortened, and energy regeneration and so on can be realized efficiently within a short time period after switching the key ON. In this case, the main relay 7 is opened after waiting for the battery voltage Vb to decrease to an appropriate voltage when charging polarization occurs in the battery 5, and therefore a situation in which the post-release capacitor voltage Vc is maintained at an unnecessarily high level can be prevented, whereby deterioration of the capacitor can be suppressed. By maintaining the capacitor 6 at an appropriate voltage without discharging the power accumulated therein even after the main relay 7 is released, protection of the capacitor 6 and suppression of power loss can be established simultaneously.

Note that in the above embodiment, an example in which relay opening control is performed by determining an OFF state of the IG SW as a key OFF state of the vehicle system was described, but the present invention is not limited to this example, and relay opening control may be performed by determining a state in which the key is removed from the key cylinder as the key OFF state, for example.

What is claimed is:

1. A vehicle power supply device, comprising a secondary battery, a capacitor connected parallel to said secondary battery, a relay interposed between said secondary battery and said capacitor, and relay control means for open-controlling said relay after a key is switched OFF, the vehicle power supply device further comprising polarization estimating means for estimating a polarization condition of said secondary battery after said key has been switched OFF, wherein said relay control means opens said relay when polarization in said secondary battery is estimated to have been eliminated by said polarization estimating means.

2. The vehicle power supply device according to claim 1, wherein said polarization estimating means estimates that said polarization in said secondary battery has been eliminated when an elapsed time after said key is switched OFF reaches or exceeds a set time.

3. The vehicle power supply device according to claim 2, wherein said set time is set variably on the basis of a temperature of said secondary battery.

4. The vehicle power supply device according to claim 2, wherein said set time is set variably on the basis of a parameter that is calculated on the basis of an SOC and an actual voltage of said secondary battery.

5. The vehicle power supply device according to claim 1, wherein said polarization estimating means calculates an open circuit voltage on the basis of at least an SOC of said secondary battery, and estimates that said polarization in said secondary battery has been eliminated when an actual voltage of said secondary battery falls below said open circuit voltage.

6. The vehicle power supply device according to claim 1, wherein said polarization estimating means estimates that said polarization in said secondary battery has been eliminated when a variation in a voltage of said secondary battery falls below a set variation.

\* \* \* \* \*